Figure 4:
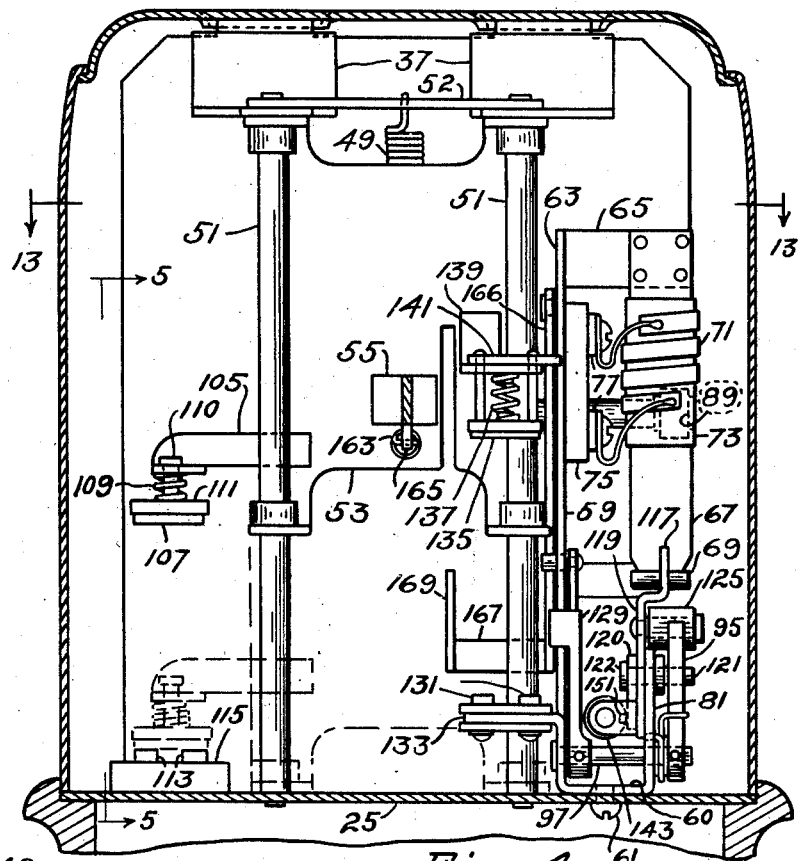

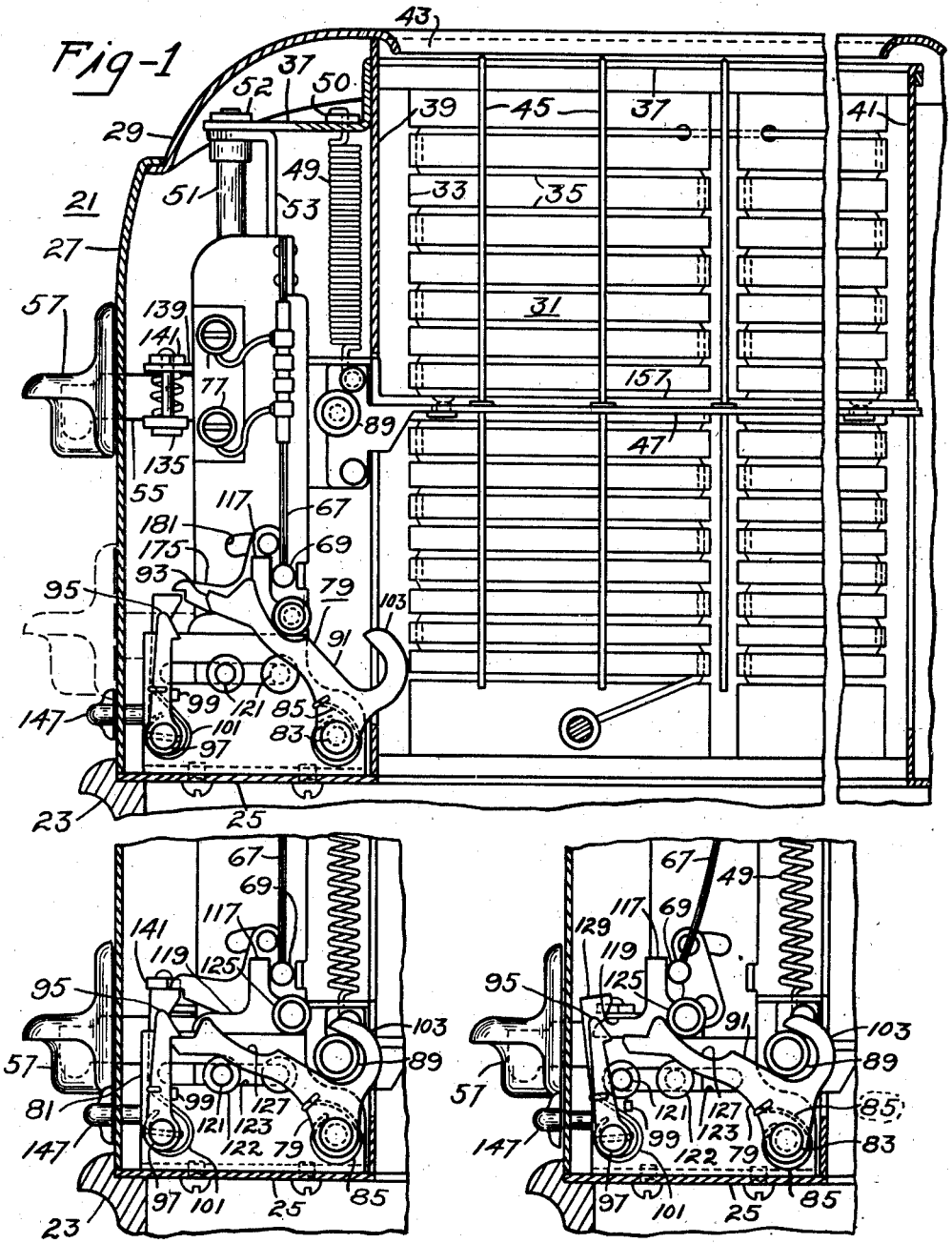

Nov. 11, 1941.    M. IRELAND    2,262,285
AUTOMATIC TOASTER
Filed Dec. 1, 1939    3 Sheets-Sheet 2

INVENTOR
MURRAY IRELAND
BY
ATTORNEY

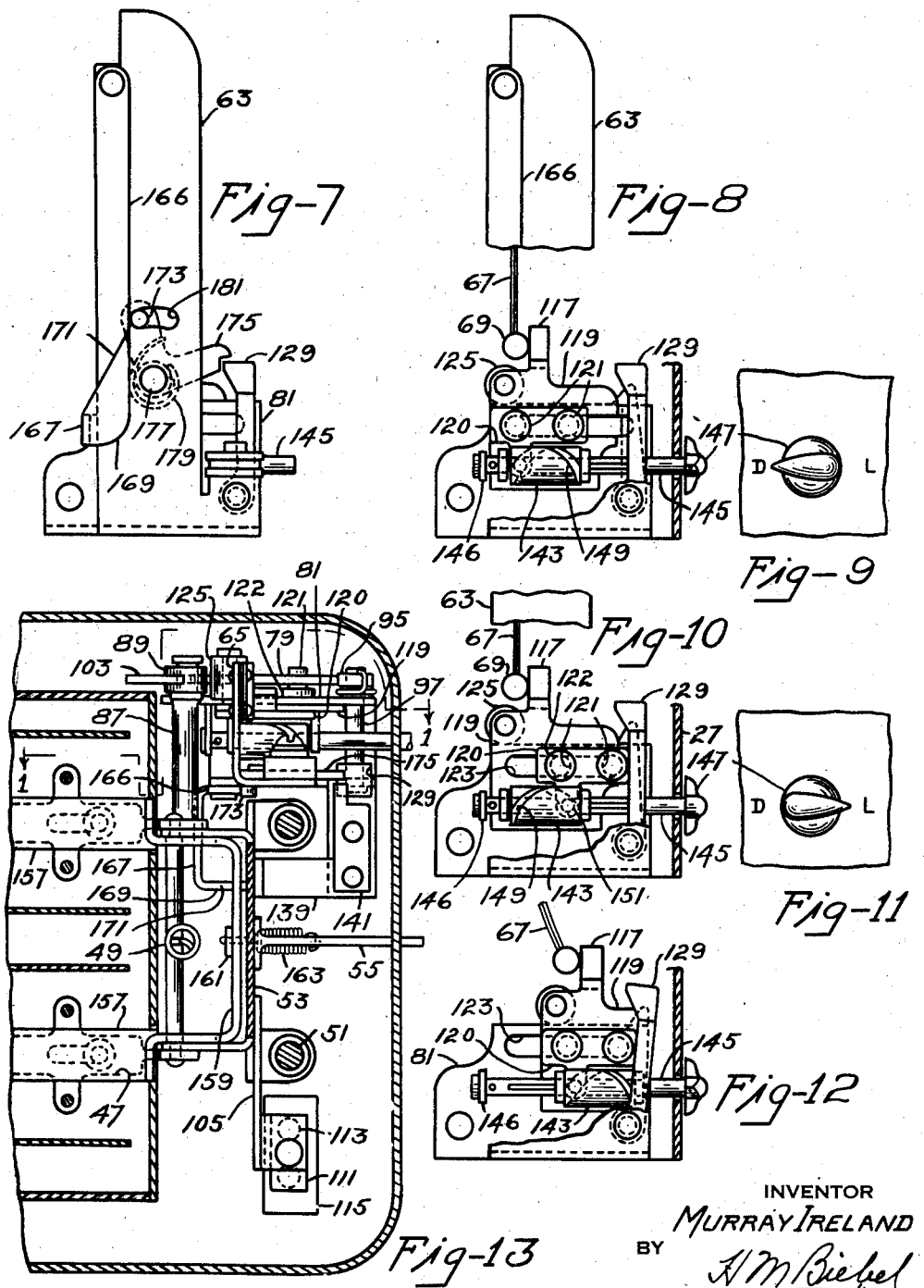

Patented Nov. 11, 1941.

2,262,285

UNITED STATES PATENT OFFICE 2,262,285

AUTOMATIC TOASTER

Murray Ireland, near Elgin, Ill., assignor to McGraw Electric Company, Elgin, Ill., a corporation of Delaware Application December 1, 1939, Serial No. 307,041

1 Claim. (Cl. 219—19)

My invention relates to automatic electric toasters and particularly to means for timing the duration of a toasting operation.

An object of my invention is to provide a relatively simple and efficient structure for a thermal timing device.

Another object of my invention is to provide a thermal timing device of the heat-up cool-off type operable in a predetermined manner.

Another object of my invention is to provide a relatively simple means in a toaster for preventing guard wire shadow marks on a toasted slice of bread.

Other objects of my invention will either be apparent from a description of one form of device embodying my invention or will be pointed out hereinafter in the specification and more particularly in the appended claim.

Figure 5:
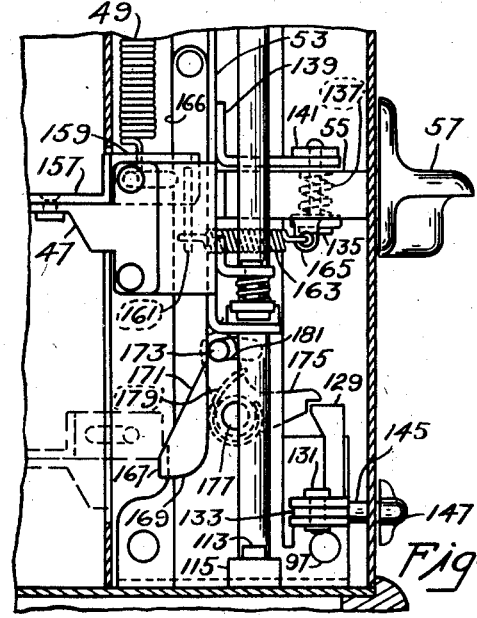
Figure 6:
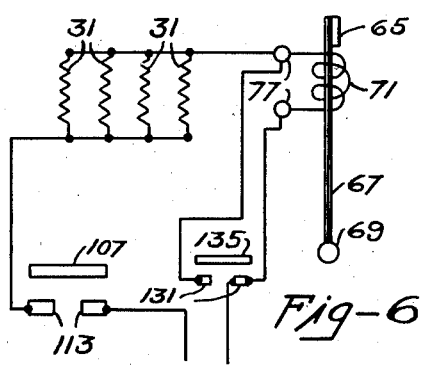

In the drawings,

Figure 1 is a view in side elevation, of an electric toaster having my invention applied thereto, a part of this view being taken on the line 1—1 of Fig. 13, Fig. 2 is a fragmentary view, in side elevation, showing the position of the detent elements of the timer in holding position at the beginning of a toasting operation, Fig. 3 is a view similar to Fig. 2 but showing the position of the detent elements at an intermediate point of a toasting operation, Fig. 4 is a view in vertical section through the front of the toaster casing, with parts shown in non-toasting position the same as in Fig. 1, Fig. 5 is a fragmentary view, in side elevation, taken on the line 5—5 of Fig. 4, Fig. 6 is a circuit diagram used in my automatic electric toaster, Fig. 7 is a fragmentary view in side elevation, of parts of the timer as seen from a point opposite to that from which Fig. 1 is taken, Fig. 8 is a fragmentary view in side elevation of the same side of the timing device as shown in Fig. 7 with parts broken away to show the manually controllable elements of the timer as adjusted for a long duration of a toasting operation, Fig. 9 is a fragmentary view in front elevation of a timer speed-controlling knob, as set to obtain a long duration of a toasting operation, Fig. 10 is a view similar to Fig. 8 but with the parts shown in a minimum-duration position, Fig. 11 shows the position of the timer speed-adjusting knob corresponding to the position of the parts shown in Fig. 10, Fig. 12 is a view similar to Fig. 8 but parts are shown in tripping position, and, Fig. 13 is a fragmentary view in horizontal section taken on the line 13—13 of Fig. 4.

I have illustrated an automatic electric toaster designated by the numeral 21, which includes a skeleton frame 23 of moulded composition material having secured thereto adjacent its upper face a metal base plate 25 which may be suitably secured in an desired manner to the frame 23. A sheet metal casing 27 includes front, rear and side walls and its open upper end is closed by a cover member 29, all in a manner well known in the art.

I have elected to show my invention as applied to a two-slice toaster although its use is not limited thereto. A two-slice toaster will include two pairs of planar vertically-extending heating elements 31, one of each of said pairs of heating elements being adapted to have positioned therebetween a slice of bread being toasted. Each heating element 31 includes one or more sheets of electric insulating material 33, such as mica, having a resistor wire or strip 35 mounted thereon, all in a manner well known in the art. The lower ends of the heating units 31 may have interfitting engagement with the base plate 25, while the upper ends thereof may have interfitting and holding engagement with longitudinally extending top frame plates 35, all in a manner well known in the art. The toaster structure includes a front intermediate wall 39 and a rear intermediate wall 41, these front and rear intermediate walls cooperating with the outermost heating units to provide a toasting chamber or a plurality thereof within the casing hereinbefore described. The cover member 29 may be provided with one or more bread-inserting apertures 43 in accordance with the number of slices of bread toastable therein at the same time. It is obvious, of course, that the top frame plates 37 will also be provided with bread-inserting and toast-removing slots registering with the slots 43 in the cover 29. Guard or guide wires 45 may be suspended from the top frame plates, all in a manner well known in the art.

Means for supporting a slice or slices of bread may include a bread carrier 47, one of which is positioned between each pair of heating elements 31 and is movable vertically therebetween. Normally the bread carrier 47 is yieldingly biased to its upper or non-toasting position shown in the full lines in Fig. 1 of the drawings. This biasing is obtained by a tension spring 49 having its lower end secured to a forwardly extending portion of the carriers, 47 while its upper end is secured to a bar 50 extending from one to the other frame plates in front of the front intermediate wall 39.

Means for guiding the bread carrier 47 in its vertical movements may include a plurality of vertical standards 51, the lower ends of which fit into and are held by the base plate 25 while their upper ends may be held by interfitting engagement with the forward end portions of frame plates 37 and with a bar 52 extending between the forward end portions of the frame plates.

A carriage 53 is slidably mounted on the two standards 51 and is provided with a forwardly extending projection 55 which latter extends outwardly beyond the front wall of the casing 27 and has mounted thereon an actuating knob 57 whereby an operator may press on the knob and move the bread carrier downwardly into toasting position wheree a slice of bread placed thereon will be positioned within the toasting chamber and subject over all of its two side areas to radiant heat from the electric heating elements.

Means for determining the duration of a toasting operation, this means embodying more particularly my invention, will now be described. A bracket 59 has its flat bottom portion 60 secured to the base plate 25 by one or more short machine screws 61 and includes a long arm 63 extending vertically upwardly, a projection 65 extending laterally of the upper end of arm 63 as will be seen more particularly in Fig. 4 of the drawings. A thermo-flexible bar 67 has its upper end suitably secured to the projection 65 and depends therefrom. A small cylindrical metal piece 69 is secured to the bimetal bar so that this member may engage means to be actuated by the free movable end of the bimetal bar 67. An auxiliary electric heater 71 is mounted on the bimetal bar 67, electric insulating material 73 being provided therebetween to suitably insulate the small heater 71 from the bimetal bar 67. A small block 75 of electric insulating material is mounted on the upper end of arm 63 to receive terminal members 77 having leads connected to the ends of the auxiliary heating element 71.

A pivotally mounted detent 79 is mounted on a vertically extending part 81 of bracket 59 and has turning movement on its pivot pin 83. Normally the detent arm 79 is yieldingly biased in a clockwise direction by a small spring 85. The bread carrier has secured thereto a rod 87 (see Fig. 13) having a roller 89 rotatably mounted thereon adjacent its outer end, the roller 89 being adapted to engage with an inclined surface 91 of the detent lever 79 which is normally in the position shown particularly in Fig. 1 of the drawings. Downward pressure on the roller 89 against the surface 91 causes turning movement of the detent lever 79 in a counter-clockwise direction until the outer end of the longer arm 93 engages under a detent-holding member 95 fixedly mounted on a shaft 97 and biased in a clockwise direction against a stub 99 by a spring 101. When the operator removes his pressure from the knob 57 after he has moved it downwardly so that roller 89 has moved into engagement with the detent lever 79 and has caused it to turn in a counter-clockwise direction, the arcuate end 103 of detent lever 79 will fit over the roller 89 and the bread carrier will be held in its lowered toasting position.

The carriage 53 has secured thereto a laterally projecting bar 105 which has mounted thereon a contact bridging member 107 spring-biased downwardly by a small coil spring 109, encircling a headed pin 110, a block of electric insulating material 111 being provided to suitably insulate the bridging member 107 from the other mechanical elements of its support. A pair of fixed contact members 113 are mounted on a block 115 of electric insulating material mounted on top of the base plate 25 in such a position as to be engageable by the contact bridging member 107 when the carriage 53 has been moved downwardly to bring the bread carrier into toasting position. The contact members 113 are connected in the electrical circuit of the toaster as shown in Fig. 6 of the drawings, and it will be evident from this diagram of connections that when an operator has moved the knob 57 down and the roller 89 is held by the detent lever arm 79 so that the carrier is in toasting position, the main heating elements 31 and the auxiliary heating element 71 will be energized. It is to be noted that while the auxiliary heating element 71 is electrically connected to a short-circuiting switch, this switch is held open at this time.

The energization of the auxiliary heater 71 causes heating and flexing of the thermo-flexible bar 67 in a clockwise direction as seen in Fig. 3 of the drawings, until the end member 69 on the thermo-flexible bar 67 engages the upper end of an arm 117. The arm 117 constitutes the upper end of a slidable plate 119, which plate supports a smaller plate 120 slidable relatively thereto. Plate 120 has secured thereto a pair of spaced pins 121, which are held thereon by enlarged heads 122 and which move in a slot 123 in member 81. One of these pins 121, namely the left-hand one, as seen in Figs. 2 and 3 for instance, is adapted to engage the holding arm 95 which normally retains the detent lever arm 79 in its carrier-holding or carrier-retaining position. When the plate 119 has been moved sufficiently to the left (as shown in Fig. 3), the pin 121 having engaged holder 95 and moved the same out of detent-holding position, the detent arm 79 would be free to turn in a clockwise direction but is prevented from doing so by a roller 125 mounted on the plate 119 in position to engage a rounded surface 127 on detent arm 79 and hold the detent arm in its carrier-locking position substantially as shown in Fig. 3 of the drawings. It may be noted that Fig. 2 of the drawings shows the position of the parts when the carriage is in toasting position and the thermo-flexible bar 67 is cold and Fig. 3 shows the positions of these parts when the thermo-flexible bar 67 has been heated to a predetermined temperature.

The shaft 97 has the holding means 95 fixedly mounted thereon at its forward end and has fixedly mounted thereon at its rear end a second arm 129. The shaft 97 is rotatably supported in parts of the bracket 59. Two contact members 131 are insulatedly mounted on a left-hand extension 133 of the bracket 59 and these contact members are connected to the ends of the auxiliary heater 71, as will be seen by reference to Fig. 6 of the drawings. The carriage 53 has mounted thereon a contact bridging member 135 normally yieldingly biased downwardly by a coil spring 137. The contact bridging member 135 may move upwardly relatively to its supporting bracket 139 secured to carriage 53 and for this purpose an upper plate 141 connected with the insulatedly supported bridging member 135 extends slightly to the right (as seen in Fig. 4) so that when carriage 53 is in its downward position, plate 141 will engage the upper end of arm 129 as long as the arm 129 is in its initial position to which it is biased by the spring 101 acting on the arm 95. When arm 95 is turned by pin 121, as has hereinbefore been described, arm 129 will be moved out of engagement with plate 141 and the contact bridging member 135 which was up to that time out of engagement with the contacts 131, will move into engagement therewith to thereby deenergize the heater 71 by short-circuiting the same, but the construction of these parts is such that 129 will move out of engagement with plate 141, a little time after arm 95 is moved out of engagement with detent 79, to ensure sufficient heating and flexing of the bimetal bar 67 to cause disengagement of arm 129 from plate 141 after release of the holding member 95 from the detent 79. This is to ensure that detent 79 will be released before bimetal bar 67 is allowed to start to cool.

The thermo-flexible bar 67 which has reached substantially the position shown in Fig. 3 of the drawings, will now cool and flex in a counter-clockwise direction as seen in Fig. 3, and the plate 119 will be free to move in a right-hand direction (as seen in Fig. 3), the force or pull of the biasing spring 49 acting upon the lever arm 79 through the roller 89 being transmitted through the long arm of the detent lever to the roller 125 and through the plate 119 and the arm 117 to the movable end of the thermo-flexible bar 67. It is therefore obvious that the pull of the biasing spring tending to return the carrier to its non-toasting position will be transmitted through the detent lever arm to the movable end of the bimetal bar assisting it in moving or flexing in a given direction during cooling, toward its initial cold position so that no work will be done by the bimetal bar 67 against any mechanical element to effect release of the detent, this of course referring solely to its operation while cooling. On the contrary, the spring 49 tends to cause turning of the detent 79, which turning is opposed by the cooling thermo-flexible bar until at a given time the arcuate portion 103 of the detent will have turned enough relatively to the roller 89 so that the roller 89 is free to move upwardly out of engagement with the portion 103, whereby the carrier is returned to non-toasting position.

Means for varying the position of a pin 121 relatively to plate 119 and to the detent holding arm 95 include a tubular cylindrical member 143 which is slidably mounted on a manually adjustable shaft 145. Shaft 145 is rotatably supported at one end by a bracket 146 integral with or secured to member 81. Longitudinal movement of shaft 145 relatively to member 81 is prevented by an enlarged head thereon at one side of bracket 146 and by a cotter pin extending through the shaft at the other side of bracket 146. The other end of shaft 145 is supported by two spaced brackets which are mounted on or are a part of plate 119. Shaft 145 is adjustable by a knob 147 mounted thereon outside of the casing 27. Member 143 is provided with an arcuate slot 149 therein which is adapted to receive a pin 151 which is secured to plate 120 to which the two pins 121 are secured. Turning movement of shaft 145 by knob 147 therefore will shift the position of plate 120 and the pins 121, one of which pins is adapted to engage holding arm 95 as has hereinbefore been set forth. It is thus evident that it is possible to vary the duration of the time during which the thermo-flexible bar is heated and the time required for it to cool and flex enough to cause releasing movement of holding arm 95 out of engagement with the detent lever arm 79.

It is evident that if member 143 and associated parts are in the positions shown in Fig. 8 of the drawings (the "Dark" position), the thermo-flexible bar 67 must be heated a relatively long time and flex through a relatively long distance before a pin 121 will engage and move detent-holding arm 95 away from detent arm 79. Roller 125 will therefore be positioned closely adjacent to the arcuate surface 127 of detent 79 and a relatively small turning movement, if any, of detent arm 79 will occur when detent holder 95 is disengaged therefrom, as above described. A relatively large degree of cooling of the bar 67 and flexing thereof will therefore be necessary before detent arm 79 will have turned enough to release roller 89 therefrom with return of the bread carrier to non-toasting position and opening of the circuits in the toaster. If, however, member 143 and the parts associated with it are in the positions shown in Fig. 10 (the "Light" position), the thermo-flexible bar 67 need not be heated to as high a temperature and need not flex as much to cause a pin 121 to engage arm 95 from the detent 79. The detent 79 may then turn slightly in a clockwise direction (as seen in Fig. 3) and engage roller 125, since roller 125 was not close to the arcuate surface 127 of detent arm 79 when holding arm 95 was disengaged from detent 79. A lesser degree of cooling of the bar 67 and a smaller degree of flexing of the bar and movement of the roller 125 is necessary to cause disengagement of the roller 89 from the detent arm and return of the bread carrier to non-toasting position.

It may be here pointed out by reference to Figs. 8 to 11 inclusive, that the positions of the movable parts of the detent-releasing mechanism hereinbefore described are shown in their two limiting positions. It will be noted that Figs. 8 and 9 show member 143 is in a position to obtain the longest duration of a toasting operation and therefore dark toast, while Figs. 10 and 11 show the parts when they are in position calling for a light degree of toasting, the letters "D" and "L" being understood to refer to "Dark" and "Light."

My invention provides also relatively simple means for causing horizontal movement of the slice or slices of bread being toasted to prevent shadows of the guard wires 45 from appearing on the toasted slices of bread. This means includes a movable top plate 157 on each of the bread carriers 47, the forward ends of which are connected to a bar 159 bent to channel shape. Member 159 has secured thereto a depending bar 161 to which is secured one end of a biasing spring 163, the other end of which is secured to a lug 165 which may be a part of or be secured to arm 55.

A depending lever arm 166 is pivotally mounted on the upwardly extending portion 63 of bracket 59 and has at its lower end a horizontally extending portion 167 to the outer end of which is secured a short upwardly extending arm 169 having a cam surface 171 at its inner face, as shown more particularly in Fig. 5 of the drawings. The cam surface 171 is normally held in substantially the position shown in Fig. 5 of the drawings by a pin 173 engaging arm 166, this pin being secured to the end of one arm of a bell crank lever 175 pivotally mounted on a fixed pin 177. The outer end of the other arm of bell crank lever 175 normally engages the upper end of arm 129. Bell crank lever 175 is normally biased in a counter-clockwise direction by a small spring 179, the pin 173 moving in a slot 181 in bracket portion 63, whereby its turning movement, as well as that of bell crank lever 175, is limited.

When the knob 57 is first moved downwardly, member 159 will engage cam surface 171, whereby auxiliary bread carrier plate 157 is moved toward the left, as seen in Fig. 5 of the drawings, and when arm 129 is permitted to turn in a clockwise direction, as hereinbefore described, bell crank lever 175 may turn in a clockwise direction, being urged thereto by spring 163, which at the same time causes movement in a right-hand direction of auxiliary carrier plate 157, whereby the bread slices are moved horizontally relatively to the guard wires to prevent shadows thereof appearing on a toasted slice of bread.

The device particularly embodying my invention thus provides a relatively simple and highly effective means controlled by a thermo-flexible bimetallic bar operating on the heat-up cool-off cycle to control the duration of a toasting operation. It is again pointed out that the thermo-flexible bar does not effect any mechanical work while cooling and finally releasing the bread carrier detent but that the biasing means for returning the bread carrier to its non-toasting position provides the necessary force and assists the bimetallic element in its flexing incident to its cooling.

While I have illustrated and described a specific device embodying my invention, I do not desire to be limited thereto and all modifications coming clearly within the scope of the appended claim are to be considered as being covered thereby.

I claim as my invention:

In an automatic electric toaster comprising a heating means, a bread carrier movable into toasting and non-toasting positions relatively to said heating means, guard wires between the heating means and the carrier, a timing device for determining the duration of a toasting operation and means actuable by the timing device to cause movement of the bread relative to the carrier during a toasting operation to prevent the occurrence of guard wire shadows on the toasted surface of a slice of bread.

MURRAY IRELAND.